US009940342B2

United States Patent
Nguyen et al.

(10) Patent No.: US 9,940,342 B2
(45) Date of Patent: Apr. 10, 2018

(54) STABILITY MEASUREMENT FOR FEDERATION ENGINE

(71) Applicant: Red Hat, Inc., Raleigh, NC (US)

(72) Inventors: Filip Nguyen, Brno (CZ); Filip Elias, Vysni Lhoty (CZ)

(73) Assignee: RED HAT, INC., Raleigh, NC (US)

( * ) Notice: Subject to any disclaimer, the term of this patent is extended or adjusted under 35 U.S.C. 154(b) by 260 days.

(21) Appl. No.: 14/496,900

(22) Filed: Sep. 25, 2014

(65) Prior Publication Data

US 2016/0092575 A1    Mar. 31, 2016

(51) Int. Cl.
G06F 7/00      (2006.01)
G06F 17/30     (2006.01)
G06F 11/07     (2006.01)
G06F 11/36     (2006.01)

(52) U.S. Cl.
CPC .... G06F 17/30306 (2013.01); G06F 11/0766 (2013.01); G06F 11/36 (2013.01)

(58) Field of Classification Search
None
See application file for complete search history.

(56) References Cited

U.S. PATENT DOCUMENTS

| | | | |
|---|---|---|---|
| 7,243,089 B2 | 7/2007 | Becker-Szendy et al. | |
| 8,712,955 B2 | 4/2014 | Friedlander et al. | |
| 9,007,922 B1* | 4/2015 | Mittal | H04L 43/50 370/242 |
| 2004/0186829 A1 | 9/2004 | Suzuki et al. | |
| 2009/0089410 A1 | 4/2009 | Vicente | |
| 2009/0132611 A1 | 5/2009 | Brown et al. | |
| 2012/0239981 A1* | 9/2012 | Franke | G06F 11/368 714/38.1 |
| 2013/0133059 A1* | 5/2013 | Maman | G06F 17/30566 726/12 |
| 2013/0159964 A1* | 6/2013 | Szpak | G06F 11/3684 717/105 |
| 2013/0326302 A1* | 12/2013 | Han | H03M 13/1142 714/752 |

FOREIGN PATENT DOCUMENTS

| | | |
|---|---|---|
| CN | 102299820 | 12/2011 |
| CN | 102724304 | 10/2012 |
| WO | WO2014060050 | 4/2014 |

OTHER PUBLICATIONS

Haissam Ziade et al "A Survey on Fault Injection Techniques", the international Arab journal of information technology, vol. 1, No. 2, Jul. 2004, 16 pages.*
J. Christmansson et al, "An Experimental Comparison of Fault and Error Injection", IEEE Aug. 2002, 10 pages.*

(Continued)

Primary Examiner — Uyen Le
(74) Attorney, Agent, or Firm — Haynes and Boone LLP

(57) ABSTRACT

Methods, systems, and computer program products for implementing a stability measurement are provided. A computer-implemented method for measuring stability may include creating a destabilized data source for a data source, wherein errors are injected into the destabilized data source; sending test queries to the destabilized data source and the data source; and comparing results of the test queries in order to calculate a stability measurement.

20 Claims, 5 Drawing Sheets

(56) References Cited

OTHER PUBLICATIONS

Henrique Madeira et al, "On the Emulation of Software Faults by Software Fault Injection", IEEE 2000, 10 pages.*
Ahmet Sayar, "Fine-Grained Federation of Geographic Information Services Through Metadata Aggregation," http://www.academicjournals.org/article/article1386930914_Sayar.pdf, Academic Journals, vol. 8(46), Dec. 11, 2013, pp. 2242-2256.
Muhammad Saleem, et al., "A Fine-Grained Evaluation of SPARQL Endpoint Federation Systems," http://www.semantic-web-journal.net/system/files/swj625.pdf, Universität Leipzig, IFI/AKSW, PO 100920, D-04009 Leipzig; Digital Enterprise Research Institute, National University of Ireland, Galway, 2009, pp. 1-20.
Stuart Madnick, "Information Integration and Re-Use," https://www.google.com/url?sa=t&rct=j&q=&esrc=s&source=web&cd=6&cad=rja&uact=8&ved=OCEoQFjAF&URL=http%3A%2F%2Fweb.mit.edu%2Fsmadnick%2Fwww%2FPresentations%2F2006-09-05%2520Overview%2520of%2520Projects.ppt&ei=SqT8U4W3A8G6uASYwoCYBw&usg=AFQjCNHyh4iMUe_PlqYSCaSh_JAKFrH4Mg&sig2=d9SD_SIJwc6Xs9fIF191Xw&bvm=bv.73612305,d.c2E, Boston Globe, Oct. 1, 1999, pp. 1-9.

* cited by examiner

STABILITY MEASUREMENT FOR FEDERATION ENGINE

BACKGROUND

A federated database system is a type of database management system (DBMS). In a federated database system, a federation engine may be coupled to a plurality of databases, from which the federation engine may access data. Queries of the plurality of databases may be received by the federation engine from a plurality of clients. The federation engine may decompose each query into sub-queries that are distributed to the plurality of separate databases. The result of the sub-queries may then be aggregated into one or more result sets, also known as a virtual views, by the federated database system. The federated database may present the data from a plurality of data sources to a client as though the data is located in a single database. Clients may access the virtual view by querying the federation engine, which returns the virtual view results to the clients.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
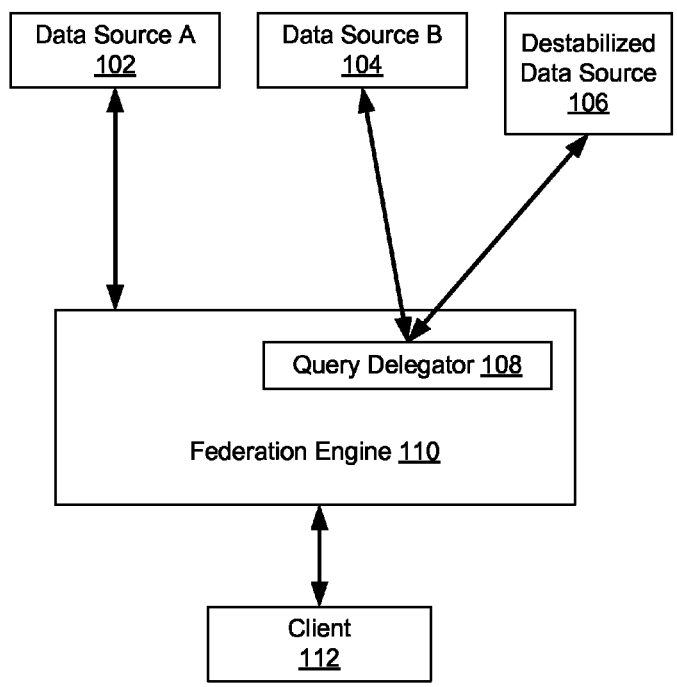
FIG. 1 is a block diagram illustrating a federated system architecture for data communications, in accordance with various examples of the present disclosure.

FIG. 1 illustrates an exemplary federated system architecture 100 in which examples of the present disclosure can be implemented. In federated system architecture 100, client 112 (e.g., user machine), data source A 102, data source B 104, destabilized data source 106 and federation engine 110 are communicatively coupled via a network. The network may be a public network (e.g., the Internet), a private network (e.g., a local area network (LAN) or wide area network (WAN)), or a combination thereof. In another example, there may be one or more of each illustrated component (e.g., a plurality of clients, one data source, a plurality of data sources, and so forth).

In an example, the network may include the Internet and/or one or more intranets, landline networks, wireless networks, and/or other appropriate types of communication networks. In one example, the network may comprise a wireless telecommunications network (e.g., cellular phone network) adapted to communicate with other communication networks, such as the Internet.

Client 112 may be a computing device, such as a personal computer (PC), laptop, mobile phone, smart phone, smart television, tablet computer, or any other type of computing device. Client 112 may run an operating system (OS) that manages hardware and software of a respective machine. The operating system may be any standard or proprietary OS. A browser may run on the OS of a client. The browser may be a web browser that can access content and services provided by federation engine 110. Further, other types of software applications (e.g., applications, mobile applications, "apps") running on client 112 may provide access to content and services of federation engine 110 without the use of a browser.

In the present example, data sources such as data source A 102, data source B 104 and destabilized data source 106 may be any standard or proprietary database for storing data. For example, a data source may be an SQL-compliant database. In another example, a data source may be a flat file. Data sources may be homogenous or heterogeneous (e.g., data source 102 may be an SQL database and data sources A 104 and B 106 may each be a flat file).

A data source may be configured on a computing device such as a rackmount server, a router computer, a personal computer, a portable digital assistant, a mobile phone, a laptop computer, a tablet computer, a camera, a video camera, a netbook, a desktop computer, a media center, or any combination thereof. A computing device may store one or more data sources.

Each computing device may be structured with a database application that interacts with the data source, such as by receiving queries from federation engine 110, querying the data source and returning results to federation engine 110. In one example, a Java Database Connectivity (JDBC) API is implemented on a data source computing device, in order for federation engine 110 to access the data source using the API.

Data source B 104 and destabilized data source 106 represent data sources that are communicatively coupled to query delegator 108. Query delegator 108 is structured to communicate with data source B 104 and destabilized data source 106 during a stability measurement of a data source B 104. In the present example, data source B 104 is an original data source, and destabilized data source 106 is a destabilized version of data source B. A destabilized data source is data source is, at least in part, a copy of an original data source. The destabilized data source is structured with intentional errors. The destabilized data source may be similar to the original data source in that the metadata may be similar, or in another example the destabilized source data values may also be similar.

Query delegator 108 is structured as one or more query delegator functions that interact with data sources during a stability measurement. In the present example, there may be a separate query delegator function for each type of data source (e.g., a first query delegator function for an SQL database data source and a second query delegator function for a flat file data source). Query delegator 108 is communicatively coupled to both federation engine 110 and the data sources, such that query delegator 108 is an intermediary, or "proxy", for federation engine 110 to access data from data sources (e.g., data source B 104) and destabilized data sources (e.g., destabilized data source 106), during a stability measurement.

Federation engine 110 is structured with a database management system and may be stored on a machine such as a rackmount server, a router computer, a personal computer, a portable digital assistant, a mobile phone, a laptop computer, a tablet computer, a camera, a video camera, a netbook, a desktop computer, a media center, or any combination thereof. In one example, federation engine 110 is structured with TEIID software, which is data virtualization software that allows applications to use data from multiple heterogeneous data stores. In another example, federation engine 110 may be any standard or proprietary query engine.

Federation engine 110 is structured to communicate with data sources (e.g., data source A 102) and clients (e.g., client 112) to receive client queries, retrieve data from the data sources, and present data to the clients in one or more federated views (i.e., "virtual views").

As a federated system grows to include additional data sources, it may become more difficult to ensure high stability of data sources in the federated system. Ensuring high stability may be even more difficult when the data sources are heterogeneous. Accordingly, federated system 100 is structured to measure stability of each data source and federated system 100 as a whole in order to assist an administrator in configuring the system to ensure high stability.

Figure 2:
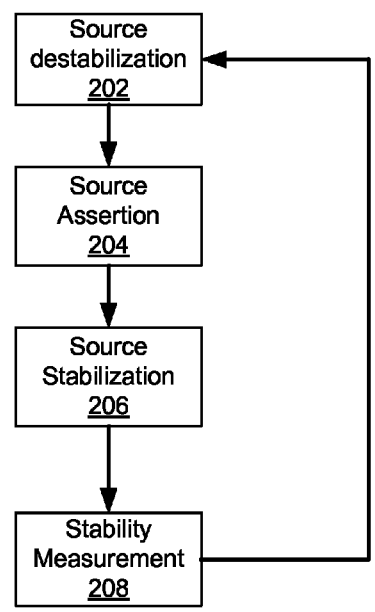
FIG. 2 is a flow diagram illustrating a stability measurement, according to an example of the present disclosure.

FIG. 2 is a flow diagram illustrating a stability measurement, according to an example of the present disclosure. Method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 200 for measuring stability may be performed "on the fly" during normal operation of the federation engine (e.g., data sources do not need to be taken offline during stability measurements). There are four main phases of a stability measurement, which include a source destabilization phase 202, a source assertion phase 204, a source stabilization phase 206 and a stability measurement phase 208. In one example, source destabilization, source assertion and source stabilization phases may be looped, to measure stability a plurality of times for each of the data sources, prior to calculating a total stability measurement for the entire federated system over a period of time during the stability measurement phase.

Method 200 begins at block 202 with a selection of a set of one or more data sources from the federated system and a defining of a set of one or more errors with which to destabilize the set of data sources.

Once the set of data sources are selected, and a set of errors are defined, the metadata of a first data source in the set of data sources is copied to a new data source, which will be referred to as the "first destabilized data source." This copied metadata may include, for example, the file location, the connection string for a database, identifiers of tables in a database, headers of columns, the file size, data type information for data of each column. The copied metadata is modified in the first destabilized data source to "destabilize" the first destabilized data source. An example of a destabilizing modification of the metadata is removing a column, such that the first destabilized data source is missing a column that is present in the first data source. Each error in the set of errors may be injected into the first destabilized data source.

Errors may also be injected into data values of the first destabilized data source. For example, metadata of the first data source may indicate that a particular column stores number values. A non-compatible data type such as a non-number value or a null value may be inserted into the column of the first destabilized data source. These injected error values may be stored in the first destabilized data source.

The original, unchanged by error injection, data values may be stored in the first data source and "intercepted" in order to allow queries of the original data values from the first destabilized data source without actually copying the original data values to the first destabilized data source. In this example, copying all of the original data values from all columns of the first data source to the first destabilized data source may be an expensive operation. Therefore, original data values may not be copied from the first data source to the first destabilized data source. Original data values for the first destabilized data source may be accessed instead from the first data source. The retrieved data values from the first data source are "intercepted", or redirected to appear as if originating from the first destabilized data source, and overwritten with any injected error values in order to accurately simulate an accurate result set of the first destabilized data source. Replacing only the original values that have changed due to injected errors allows the first destabilized data source to store only a subset of its data values. The intercepting of original data values and injecting of errors into original data values is explained in further detail regarding FIG. 3.

In the present example, the metadata from the first data source is copied to the first destabilized data source without copying the actual data values themselves. In another example, however, data values from each data source may be copied into its corresponding destabilized data source, in addition to copying the metadata.

In the present example, after injecting all errors from the set of errors into the first destabilized data source, all errors from the set of errors are injected into a second selected data source to generate a second destabilized data source. The method continues until a destabilized data source is generated for each data source in the set of data sources.

The federation engine may establish a query delegator "proxy" for each data source that is destabilized and its corresponding destabilized data source such that queries to the data sources and their destabilized data sources may be separately processed from standard traffic using the query delegator as an intermediary.

At block 204, a set of test queries is selected for each data source. In the present example, these test queries are queries that represent real usage of the federation engine. In this example, the set of test queries may be selected from a federation engine query log by a test client. The query log stores past/historical queries that federation engine has received.

In the present example, each query in the set of test queries may be sent two times from the test client, in order to send the query to both the data source (e.g., the first data source) and destabilized data source (e.g., the first destabilized data source) corresponding to the data source. The data source query and the destabilized data source query may be referred to as a query tuple, such as (original query, destabilized query). Queries that are sent from the set of test queries may be tagged, such that the federation engine is able to distinguish test queries from standard traffic. In the present example, a tagging mechanism for SQL databases may be setting the SQL query hint value to tag test queries for data sources with "original" and destabilized data sources with "destabilized."

Standard traffic may continue to be routed to other data sources not in the set of data sources via the federation engine. The data sources in the set of data sources remain accessible to standard traffic and do not need to be taken offline during the stability measurement.

Test queries for each data source and destabilized data source may be received by the query delegator of the federation engine and sent to the appropriate data source or destabilized data source. The query delegator may receive the query responses and send the responses to the federation engine, which sends the query responses to the test client.

Each query response from a data source may be received by the test client and compared with the corresponding query response received from the destabilized data source. The test client then may count, for each data source, the amount of test query tuples (e.g., original query, destabilized query) that have the same result, and the amount of the test query tuples that have a different result. The amount of test query tuples that have the same result and the amount of test query tuples that have a different result may be expressed as a ratio or percentage, to measure the stability of a data source. For example, there may be ten total test query tuples (ten original queries and ten matching destabilized queries). If only five of the original queries return the same result sets as five of the matching destabilized queries, then the stability of the data source may be expressed as 5/5, or 50%.

In another example, the amount of test query tuples that have the same result or that have a different result may be expressed as a ratio or percentage based on the total amount of test query tuples, in order to measure the stability of a data source. For example, there may be ten total test query tuples (ten original queries and ten matching destabilized queries). If only five of the original queries return the same result sets as five of the matching destabilized queries, then the stability of the data source may be expressed as 5/10 or 50%.

To determine whether a result is the same as another result, the data values may be compared to determine whether both query results have the same number of data values and that all data values are a match.

The stability of a data source may be measured over a period of time using a plurality of test queries with the stability of the data source being averaged to determine an average stability of the data source.

Each data source in the set of data sources, and its corresponding destabilized data source, may be similarly processed with test query tuples to determine a stability measurement and an average stability measurement.

In block 206, the destabilized data sources are removed. Each data source in the set of data sources is reconnected to the federation engine such that the query delegator no longer proxies requests for the data sources in the set of data sources, as an intermediary between the federation engine and the data sources.

In block 208, the total stability of the federated system may be calculated by aggregating the stability of each source according to the following formula:

$$\frac{\sum_{s \in sources} avgstab(S)^{pow}}{|sources|}$$

Where sources is a set of sources; pow is a power that is configured by an administrator; avgstab is an average stability of a source; and |sources| is the total number of sources.

Raising the power, in the above formula, results in a larger effect for a destabilized data source on the total measured stability of the federated system. Raising the power may be desirable to more effectively determine when a data source is very unstable. Accordingly, by lowering the power (e.g., lowering the power to 1), a destabilized data source that is very unstable will have less of an effect on the total stability measurement for the federated system.

Figure 3A:
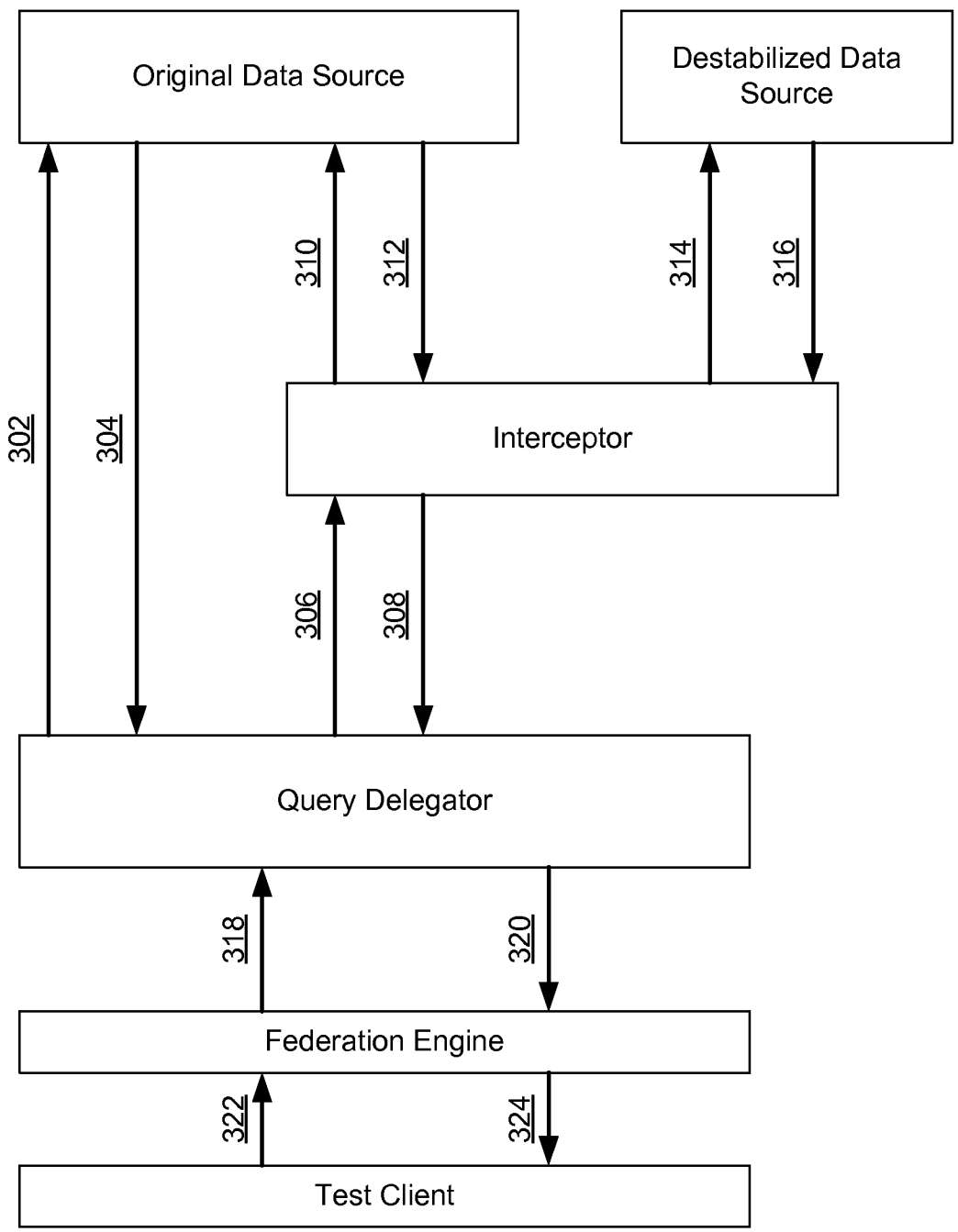
FIG. 3A is a flow diagram illustrating an accessing of data sources during a stability assertion phase, according to an example of the present disclosure.

FIG. 3A is a flow diagram illustrating a query delegator accessing data sources during a stability assertion phase, according to an example of the present disclosure. The method 300 may be performed by processing logic that may comprise hardware (e.g., circuitry, dedicated logic, programmable logic, microcode), software (such as instructions run on a general purpose computer system, dedicated machine, or processing device), firmware, or a combination thereof.

In the present example, a query delegator receives queries for an original data source and a destabilized data source that corresponds to the original data source. The query delegator acts as a "proxy" in that the queries are not being sent directly from the federation engine to data sources as is the case for standard traffic. The destabilized data source metadata is a modified copy of metadata from the original data source. The destabilized data source metadata is modified by the insertion of errors into the destabilized source metadata. In the present example, the error data values have also been inserted into the destabilized data source data values.

In the present example, at 322, a test client sends a first query of a set of test queries to the federation engine, where the first query is a query of the original data source, and the first query is tagged "original." Next, the test client sends a matching second query to the federation engine, where the second query is tagged "destabilized." Both the first and the second query are requests for the same set of data values.

The federation engine determines from the "original" and "destabilized" tags that the first and the second queries are to be proxied by the query delegator. Accordingly the first and second queries are forwarded to the query delegator at 318.

At 302, the first query is sent to the original data source, and at 304 the results of the first query are sent from the original data source to the query delegator. The first query results are sent at 320 and 324 to the test client as a result set corresponding to the first query.

At 306, the second query is intercepted, because the second query is a request for data values from the destabilized data source. The second query is sent at 310 to the original data source to retrieve the data values that have been queried from the destabilized data source. As discussed previously, the data values from the original data source have not been copied to the destabilized data source. Therefore the data values are retrieved from the original data source at 312, where the data value results of the query are sent from the original data source to the interceptor.

At 314, a request is sent from the interceptor for data values from the destabilized data source. At 316, the data values from the destabilized data source are sent from the destabilized data source to the interceptor. The data values sent from destabilized data source 316 contain error data values, such as data values that were injected into the destabilized data source that have a null data type or a non-compatible data type with the original data values in a particular column.

The interceptor retrieves the error data values that have been inserted into the destabilized data source (i.e., during the source destabilization phase), from the destabilized data source. The error values from the destabilized data source are inserted into the original data source results, with the error data values replacing any overlapping original data values. The combined results are sent to the query delegator at 308 as results for the second query. The second query results are sent to the federation engine at 320. The second query results are sent to the test client at 324.

Accordingly, test client has received both the results of the first query and the results of the second query. The test client compares the results of the first query to the results of the second query to determine whether each query has the same results. In this example, because the second query results include error data values, the results of the first query and the second query are not a match. Based on only the one query tuple measurement, the stability of the source is measured to be 0%. In another example, further query tuples are evaluated, which may further adjust the stability measurement for the source. For example, if a second test query were sent to both the original data source and the destabilized data source (a second query tuple), and the results of the queries were determined to be a match, the stability measurement of the source would be upgraded to 50%.

Figure 3B:
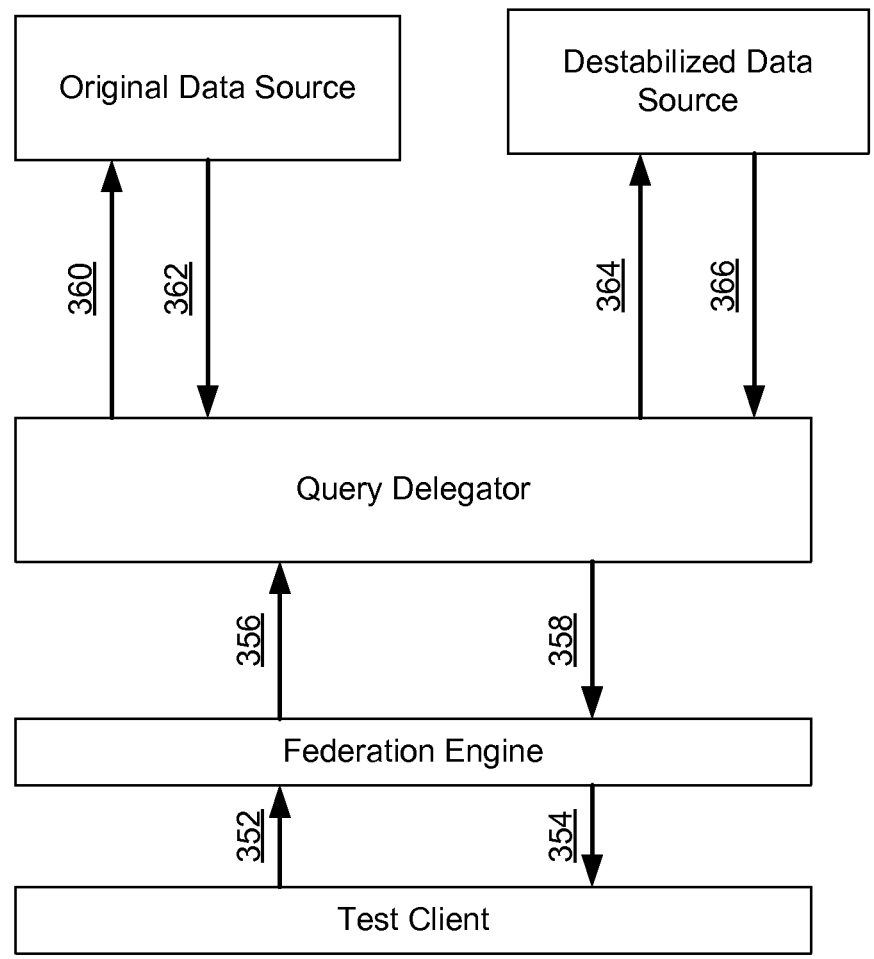
FIG. 3B is a flow diagram illustrating a query delegator accessing data sources during a stability assertion phase, according to an example of the present disclosure.

FIG. 3B is a flow diagram illustrating a query delegator accessing data sources during a stability assertion phase, according to another example of the present disclosure. The method 350 may be performed by processing logic that may comprise hardware (e.g., circuitry, dedicated logic, programmable logic, microcode), software (such as instructions run on a general purpose computer system, dedicated machine, or processing device), firmware, or a combination thereof.

In the present example, a query delegator receives queries for an original data source and a destabilized data source that corresponds to the original data source. The query delegator acts as a "proxy" in that the queries are not being sent directly from the federation engine to the data sources as is the case for standard traffic. Rather, the federation engine sends queries for the original data source and the destabilized data source to the query delegator, which sends the queries to the data sources. The destabilized data source metadata is a copy of metadata from the original data source, with a difference in the metadata being that a column is deleted from the metadata of the destabilized data source. The column is missing due to a "missing column" error that has been injected into the metadata of the destabilized data source. In this example, unlike the example illustrated in FIG. 3A, error data values have not been inserted into the data values of the destabilized data source.

At 352, the test client sends a first query request to the federation engine for data from the original data source and a corresponding second query request for data from the destabilized data source. At 356, the queries are sent from the federation engine to the query delegator, which is proxying the requests from the federation engine to the original data source.

At 360, the first query is sent from the query delegator to the original data source. At 362 the first query results are sent from the original data source to the query delegator.

At 364, the query delegator sends the second query to the destabilized data source. If the query is for any data values from the missing column, an error is returned at 366 in the second query results. If the second query is for data values that are not in the missing column, query delegator retrieves the data values for the second query from the original data source. In the present example, in order to reduce processing requirements the data values were not copied from the original data source to the destabilized data source. Therefore, original data values are retrieved from the original data source in the event that a destabilized data source is queried.

At 358, the first query results and the second query results are sent from the query delegator to the federation engine. At 354 the first query results and the second query results are sent to the test client.

The test client compares the first query results and the second query results to determine whether the query results are the same.

Figure 4:
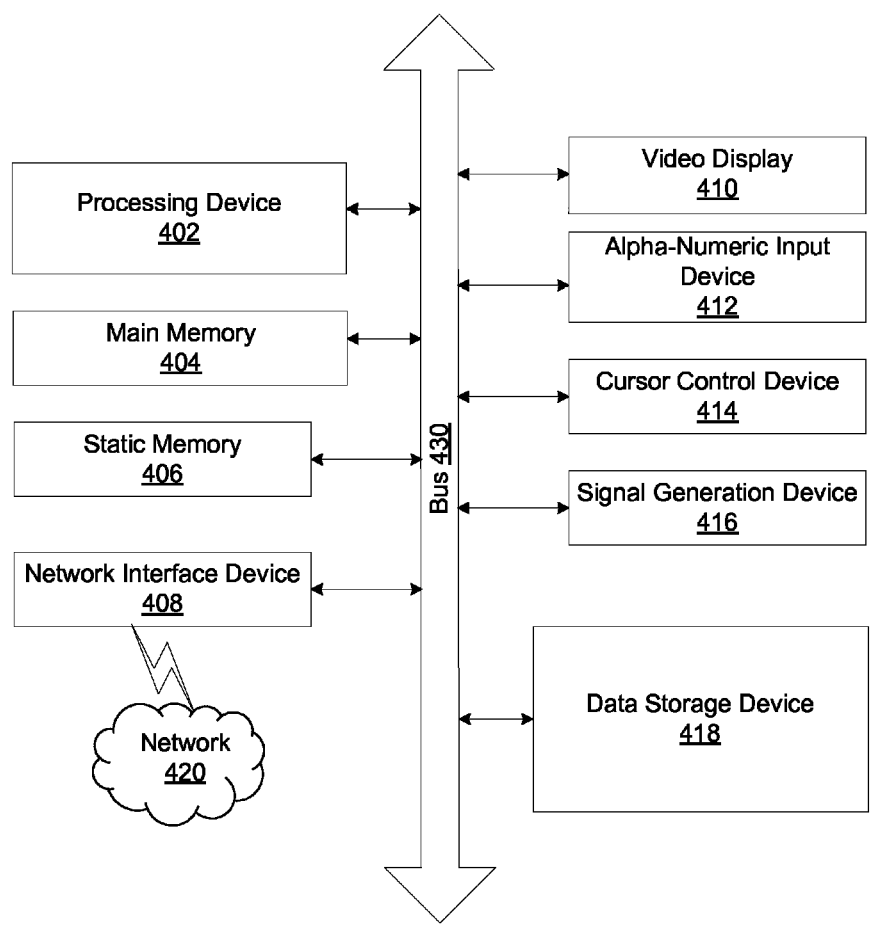
FIG. 4 is a block diagram illustrating an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), etc.), static memory 406 (e.g., flash memory, static random access memory (SRAM), etc.), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

In one example, the instructions are for enforcing separation of environments using cryptography (computing system 100 of FIG. 1) and/or a software library containing methods that call a system for enforcing separation of environments using cryptography. While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A federated system, comprising:
a federation engine structured with a memory and at least one processor, the at least one processor in communication with the memory to perform operations comprising:
copying metadata from a first data source to a second data source, the metadata including one or more of an identifier of a table, header of a column, file size, or data type information corresponding to data stored in the first data source;
injecting at least one error into the second data source, the second data source including the metadata;
receiving a first query corresponding to the first data source and a second query corresponding to the second data source;
sending the first query to the first data source and the second query to the second data source;
receiving a plurality of data values from the first data source and the at least one error from the second data source;
providing a first result corresponding to the first query, wherein the first result includes the plurality of data values; and
providing a second result corresponding to the second query, wherein the second result includes at least a portion of the plurality of data values and the at least one error.

2. The federated system of claim 1, wherein the at least one error includes one or more of a missing column, a data value of a non-compatible data type, or a null data value.

3. The federated system of claim 1, wherein the first query and the second query are based at least in part on historical queries retrieved from a query log.

4. The federated system of claim 1, wherein at least one of the first query and the second query is tagged.

5. The federated system of claim 1, the operations further comprising:
determining whether the first result and the second result are the same.

6. The federated system of claim 5, the operations further comprising:
determining a stability measurement of the first data source based at least in part on the determining whether the first result and the second result are the same.

7. The federated system of claim 1, the operations further comprising:
comparing a first plurality of query results corresponding to the first data source with a second plurality of query results corresponding to the second data source; and
determining an amount of the first plurality of query results that are the same as the second plurality of query results.

8. A non-transitory computer-readable medium having stored thereon computer-readable instructions executable to cause a processor to perform operations comprising:
receiving, from a client, a first query and a second query;
sending the first query to a first data source and the second query to a second data source, wherein the second data source includes one or more of an identifier of a table, header of a column, file size, or data type information copied from the first data source, and wherein the second data source includes one or more injected errors that do not exist at the first data source;
receiving a plurality of data values from the first data source and at least one error corresponding to the one or more injected errors from the second data source;
providing, to the client, a first result corresponding to the first query, wherein the first result includes the plurality of data values; and
providing, to the client, a second result corresponding to the second query, wherein the second result includes at least a portion of the plurality of data values and the at least one error.

9. The non-transitory computer-readable medium of claim 8, wherein the one or more injected errors comprise one or more of: a missing column, a data value of a non-compatible data type, or a null data value.

10. The non-transitory computer-readable medium of claim 8, wherein the first query and the second query are based at least in part on historical queries retrieved from a query log.

11. The non-transitory computer-readable medium of claim 8, wherein at least one of the first query and the second query is tagged.

12. The non-transitory computer-readable medium of claim 8, wherein the client compares the first result and the second result, and
wherein, based on the comparing, the client determines a stability measurement corresponding to the first data source.

13. The non-transitory computer-readable medium of claim 8, wherein the client compares a first plurality of query results corresponding to the first data source with a second plurality of query results corresponding to the second data source, and
wherein the client determines an amount of the first plurality of query results that are the same as the second plurality of query results.

14. A method comprising:
receiving, from a client, a first query and a second query;
sending the first query to a first data source and the second query to a second data source, wherein the second data source includes one or more of an identifier of a table, header of a column, file size, or data type information copied from the first data source, and wherein the second data source includes one or more injected errors that do not exist at the first data source;
receiving a plurality of data values from the first data source and at least one error corresponding to the one or more injected errors from the second data source;
providing, to the client, a first result corresponding to the first query, wherein the first result includes the plurality of data values; and
providing, to the client, a second result corresponding to the second query, wherein the second result includes at least a portion of the plurality of data values and the at least one error.

15. The method of claim 14, wherein the one or more injected errors comprise a missing column.

16. The method of claim 14, wherein the one or more injected errors comprise a data value of a non-compatible data type.

17. The method of claim 14, wherein the one or more injected errors comprise a null data value.

18. The method of claim 14, further comprising:
comparing the first result and the second result; and
based on the comparing, determining a stability measurement corresponding to the first data source.

19. The method of claim 18, further comprising:
determining a total stability by aggregating the stability measurement corresponding to the first data source with one or more stability measurements corresponding to one or more other data sources.

20. The method of claim 14, further comprising:
comparing a first plurality of query results corresponding to the first data source with a second plurality of query results corresponding to the second data source; and
determining an amount of the first plurality of query results that are the same as the second plurality of query results.

* * * * *